(12) United States Patent
Steele et al.

(10) Patent No.: US 10,507,596 B2
(45) Date of Patent: Dec. 17, 2019

(54) PROCESS FOR PREPARING MOULDED ARTICLES FROM FIBRE-REINFORCED COMPOSITE MATERIALS—I

(71) Applicant: Cytec Industries Inc., Woodland Park, NJ (US)

(72) Inventors: Mark Raymond Steele, Derbyshire (GB); Andrew Steven Gibbs, Derbyshire (GB)

(73) Assignee: Cytec Industries Inc., Woodland Park, NJ (US)

( * ) Notice: Subject to any disclaimer, the term of this patent is extended or adjusted under 35 U.S.C. 154(b) by 341 days.

(21) Appl. No.: 15/164,366

(22) Filed: May 25, 2016

(65) Prior Publication Data

US 2016/0346958 A1 Dec. 1, 2016

(30) Foreign Application Priority Data

May 29, 2015 (GB) .................................. 1509294.3

(51) Int. Cl.
*B29B 11/16* (2006.01)
*B29C 70/38* (2006.01)
(Continued)

(52) U.S. Cl.
CPC .............. *B29B 11/16* (2013.01); *B29C 70/38* (2013.01); *B29C 70/386* (2013.01);
(Continued)

(58) Field of Classification Search
CPC ..... B29B 11/16; B29C 70/386; B29C 70/541; B29C 70/38; B29K 2307/04; B29K 2105/089; B29K 2995/0063; B29K 2063/00; B29K 2105/0094; B29K 2995/0065; B29K 2995/0097; B29K 2105/0872
See application file for complete search history.

(56) References Cited

U.S. PATENT DOCUMENTS 6,013,730 A 1/2000 McGrail et al.
7,341,086 B2 3/2008 Nelson et al.
(Continued)

FOREIGN PATENT DOCUMENTS

EP 0311349 4/1989
EP 0365168 4/1990
(Continued)

*Primary Examiner* — Nahida Sultana
(74) *Attorney, Agent, or Firm* — Thi Dang

(57) ABSTRACT

The present invention relates to low or zero-tack composite materials such as pre-pregs and their use in automated manufacturing, particularly robotic pick and place. The present invention further relates to an automated process for preparing an article, particularly a molded article, from a fiber-reinforced composition material.
The molded articles prepared by the process described herein are particularly suitable as components for transport applications, and particularly the automotive industry. The automotive components prepared by the present invention are particularly suitable as mid- or high-volume automotive parts, in which cost and speed of production are paramount. The present invention provides a process in which the cutting and handling of pre-preg materials is greatly simplified, providing advantages of efficiency and economy. The lay-up time according to the present invention is significantly reduced, allowing a reduction in the unit cost per component and/or allowing the high volume of component production desired in the automotive industry.

18 Claims, 3 Drawing Sheets

(51) Int. Cl.
  *B29C 70/54* (2006.01)
  *B29K 105/08* (2006.01)
  *B29K 63/00* (2006.01)
  *B29K 105/00* (2006.01)
  *B29K 307/04* (2006.01)

(52) U.S. Cl.
  CPC ........ *B29C 70/541* (2013.01); *B29K 2063/00* (2013.01); *B29K 2105/0094* (2013.01); *B29K 2105/089* (2013.01); *B29K 2105/0872* (2013.01); *B29K 2307/04* (2013.01); *B29K 2995/0063* (2013.01); *B29K 2995/0065* (2013.01); *B29K 2995/0097* (2013.01)

(56) References Cited

U.S. PATENT DOCUMENTS

| | | | |
|---|---|---|---|
| 7,588,438 B2 * | 9/2009 | Xu | G01N 1/04 |
| | | | 425/313 |
| 9,421,693 B2 * | 8/2016 | Baechtold | B26D 7/0675 |
| 9,821,474 B2 * | 11/2017 | Reinhold | B65H 3/0816 |
| 2005/0042323 A1 | 2/2005 | Habisreitinger et al. | |
| 2011/0287246 A1 * | 11/2011 | Arai | C08J 5/24 |
| | | | 428/300.1 |
| 2015/0115505 A1 * | 4/2015 | Jones | B29C 70/345 |
| | | | 264/511 |
| 2015/0183139 A1 * | 7/2015 | Takano | B29C 70/44 |
| | | | 264/219 |
| 2018/0326678 A1 * | 11/2018 | Villalon | B29B 17/0026 |
| 2018/0355132 A1 * | 12/2018 | Haro | C08J 5/24 |

FOREIGN PATENT DOCUMENTS

| | | |
|---|---|---|
| EP | 0486197 | 5/1992 |
| EP | 1072634 | 1/2001 |
| JP | 2010229211 A | 10/2010 |
| WO | 2011117643 | 9/2001 |
| WO | 2007135418 | 11/2007 |
| WO | 2009118536 | 10/2009 |
| WO | 2012100980 | 8/2012 |
| WO | 2014035579 A1 | 3/2014 |

* cited by examiner

Wall thickness = 1 mm 22 mm 4.6 mm 11 mm

PROCESS FOR PREPARING MOULDED ARTICLES FROM FIBRE-REINFORCED COMPOSITE MATERIALS—I

This patent application claims priority to pending UK patent application 1509294.3 filed May 29, 2015 incorporated herein in its entirety.

The present invention relates to low or zero-tack composite materials such as pre-pregs and their use in automated manufacturing, particularly robotic pick and place. The present invention further relates to an automated process for preparing an article, particularly a moulded article, from a fibre-reinforced composition material.

The automated handling of fibre-reinforced composite materials (commonly referred to in the art as pre-pregs, or resin-impregnated reinforcement fibre fabrics or mats) is well established. Disclosures which teach such methods and devices include US-2005/0042323-A and U.S. Pat. No. 7,341,086. However, conventional fibre-reinforced composite materials are designed to be sticky or tacky at room temperature in order that plies of pre-pregs can be laminated onto a surface, such as a mould tool or upon other plies of pre-preg in such a way that the pre-preg remains in place until its position is secured prior to cure with further tooling or with cure-related consumables, vacuum bagging etc. While this may assist hand lamination, and indeed be a requirement in some automated processes, it nevertheless requires protective interleaves, such as polymer sheets or paper, to enable the material to be easily unrolled, cut and handled. For automated processes, such as robotic pick and place, the task of removing the interleaves is a complicated, unreliable and time-consuming step. It would therefore be desirable to avoid the use of such interleaves.

One solution to the problem has been to decrease the temperature of the working environment, thereby increasing the viscosity and reducing the tack of the fibre-reinforced composite material. Below a certain temperature, the pre-preg will exhibit reduced tack but additionally will be brittle and inflexible due to the viscosity of the resin approaching the point where it becomes a glassy solid material as opposed to mobile and resinous. To achieve a pre-preg with low or no tack at ambient temperature would conventionally require the thermosetting formulation to be solid or very close to being solid at the ambient temperature. Pre-pregs which are brittle and inflexible, or in a brittle and inflexible state, are difficult to wind and unwind around a core, and typically compromise processes which involve positioning the material onto a mould tool. Moreover, the fibre-reinforced composite material typically retains at least some of its tack, resulting in the possibility of resin build-up on manufacturing equipment and deviation from strict resin areal weight quality control requirements, and hence the need for interleaves remains. Furthermore, this solution increases manufacturing costs and may introduce moisture and vapour issues, as well as requiring additional machine adaptations and health and safety considerations.

It would be desirable for the fibre-reinforced composite materials used in such automated processes to exhibit a tack-free surface, which would greatly improve the handling and cutting of these materials, as well as reducing or eliminating resin build-up on the manufacturing equipment when producing moulded articles therefrom, particularly while retaining flexibility. It would be desirable to provide a fibre-reinforced composite material which would allow tack and flexibility to be adjusted independently. It is particularly desired to increase the speed and/or reduce the cost of the preparation of moulded articles prepared from fibre-reinforced composite materials.

WO 2011/117643 A1 discloses a curable sheet-like composite material, which comprises a layer of curable resin sandwiched between two layers of structural fibres that are not fully impregnated with the curable resin, and which further comprises a resin backing layer adjacent to one of the structural fibre layers. The resin backing layer has a shear-dependent rheology and exhibits no flow at rest, but a viscous flow response to induced shear. When rolled and unrolled, the induced shear from unrolling causes viscous flow in the resin backing layer, which imparts resin from the backing layer onto the opposing surface of the composite material as the material is unrolled. As a result of the viscous flow of the resin backing layer during unrolling, the composite material is tacky on both surfaces and the composite material will impart resin to machinery it contacts during automated manufacturing.

EP 1 072 634 A1 discloses a composite material with a resin core sandwiched between two layers of a curable outer resin, where the outer resin has lower tack than the resin core. The outer resin must possess tack to facilitate adhesion of the surface of the layer to other surfaces, for example for preparing layups. The composite material disclosed in EP 1 072 634 A1 requires the use of release papers or interleaves during rolling and storage and also during automated manufacturing. The composite materials disclosed in EP 1 072 634 A1 have cure times in the range of 2 to 15 hours.

WO 2009/118536 A1 discloses, inter alia, inflexible composite materials comprising a resin with tack and a high viscosity at room temperature at the surface of the composite material, such that when two layers of composite material are stacked, the surfaces are lightly adhered or unadhered to each other. On heating the composite material, the tack of the resin increases and the viscosity of the resin decreases. Subjecting the stacked composites to heating and vacuum allows the surfaces of the stacked composite materials to adhere to each other and inter-laminar air between adjacent composites to escape, resulting in a layup with decreased void formation between layers. The fully impregnated pre-pregs wherein the viscous resin is the sole resin are brittle and stiff at room temperature, which prevents rolling and unrolling, but the composites become less viscous and tacky at elevated temperatures, allowing the composites to be rolled but requiring interleaves to prevent composites adhering to each other. WO 2009/118536 A1 further discloses more drape-able pre-pregs where the highly viscous resin forms one or both outermost layers, with an inner core layer of a less viscous resin. The composite materials disclosed in WO 2009/118536 A1 have cure times in the range of 2 to 15 hours.

According to a first aspect of the present invention, there is provided an automated process for preparing a moulded article from a plurality of pre-pregs comprising the steps of:
  (a) providing a mould;
  (b) disposing a laminar pre-preg into or onto said mould by an automated conveying member which applies a prehensile force to said pre-preg to convey said pre-preg from a starting position to a finishing position, wherein said finishing position is in or on said mould;
  (c) repeating step (b) at least once to dispose one or more further pre-pregs into or onto said mould;
wherein said laminar pre-preg is a fibre-reinforced curable composite material, wherein said pre-preg comprises a core layer having a first surface and a second surface and further comprises a surface layer disposed directly on at least one surface of said core layer, wherein said core layer comprises one or more layer(s) of reinforcing fibres impregnated with a first curable resin, and wherein said surface layer comprises a second curable resin; and wherein the prehensile force is applied by said automated conveying member directly to the external surface of said surface layer of said pre-preg.

According to a second aspect of the invention, there is provided a laminar pre-preg of fibre-reinforced curable composite material, wherein said pre-preg comprises a core layer having a first surface and a second surface and further comprises a surface layer disposed directly on at least one surface of said core layer, wherein said core layer comprises one or more layer(s) of reinforcing fibres impregnated with a first curable resin, and wherein said surface layer comprises a second curable resin, characterised in that:

(i) the second curable resin exhibits a viscosity at 21° C. of at least 500,000 Pa·s and/or an uncured glass transition temperature (Tg) of at least 8° C.;

(ii) the first curable resin exhibits a viscosity at 21° C. of less than 500,000 Pa·s and/or an uncured glass transition temperature (Tg) of less than 8° C.

(iii) the surface layer exhibits an areal weight of from about 5 to about 100 g/m²;

(iv) the core layer exhibits an areal weight of from about 200 to about 1500 g/m²;

(v) there is no protective removable interleave disposed on or associated with an external surface of the pre-preg; and (vi) preferably wherein the first curable resin exhibits a cure conversion of at least 90%, preferably at least 95%, preferably at least 98%, when cured at a cure temperature of at least 100° C., preferably at least 120° C., preferably greater than 120° C., preferably at least 125° C., preferably at least 130° C., and preferably in the range of from about 130° C. to about 150° C., wherein the cure cycle has a duration of no more than 30 minutes, preferably no more than 15 minutes, preferably no more than 10 minutes, preferably no more than 5 minutes.

In the present invention, the need to use traditional protective interleaves is eliminated. The external surface of the surface layer is the surface which is contacted by the conveying member. The surface layer may be disposed on each of the outer surfaces of the fibre-reinforced composite material, and thereby forms one or both of the outer surfaces of the laminar pre-preg. The outer surfaces of the pre-preg are therefore advantageously tack-free at ambient temperature (i.e. a temperature from about 15 to about 30° C., more typically 18 to about 23° C., and preferably 20° C.). Thus, the outer surfaces of the pre-preg, prior to curing, i.e. the pre-pregs that are disposed into or onto the mould in step (b) of the process, are tack-free. As used herein, the term "tack-free" means that two pre-preg plies of dimensions 100×100 mm do not adhere together when placed one on top of the other, by hand, after experiencing a weight of 1 kg applied evenly across the surface area of the two-ply assembly for 1 minute at an ambient temperature of 20° C.

The surface layer remains associated with the surface of the fibre-reinforced composite material to become part of the cured laminate. The surface layer advantageously allows the material to be handled by automated processes without the need to remove protective interleaves traditionally employed, thereby simplifying the cutting and handling of the fibre-reinforced composite material, and avoiding resin build-up on manufacturing equipment. Moreover, the absence of the traditional protective interleaves reduces waste and thereby manufacturing costs since it is no longer necessary to dispose of the interleaves once removed. Furthermore, the fibre-reinforced composite material is able to be handled at room temperature, thereby avoiding the problems associated with chilled working environments.

THE CORE LAYER

Figure 1:
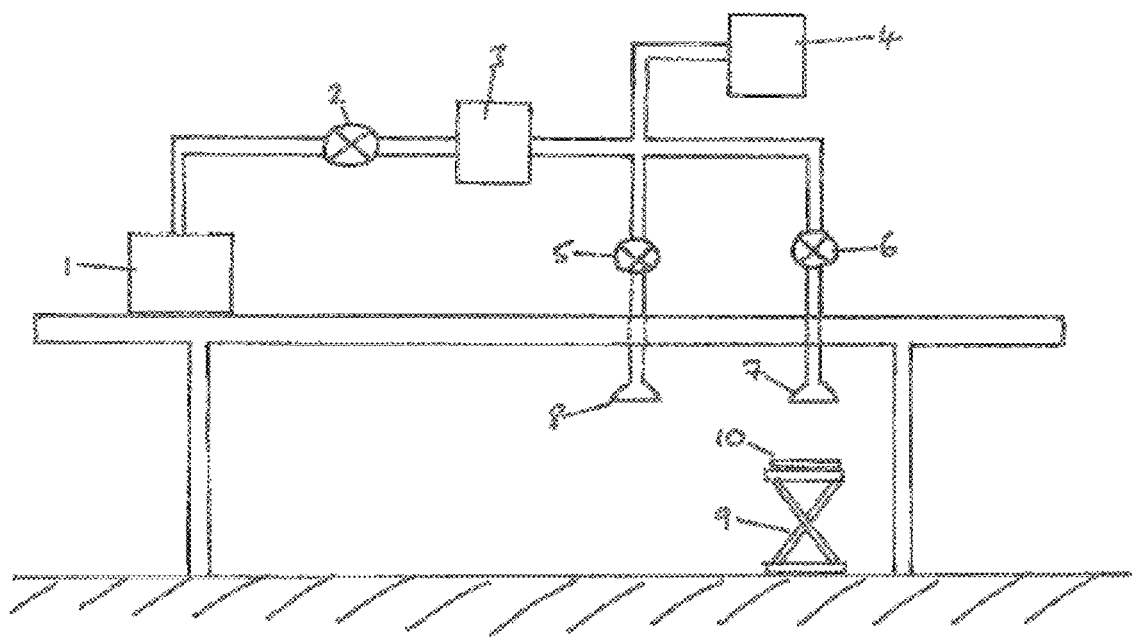
FIG. 1 illustrates the procedure for the Vacuum Cup Performance test.

The core layer of the laminar pre-preg used in the present invention comprises or consists of one or more layer(s) of reinforcing fibres impregnated with a first curable resin. The core layer is preferably a layer in which said layer(s) of reinforcing fibres are fully impregnated with said curable resin. As used herein, the term "fully impregnated" means that the curable resin is present throughout the cross-section of the core layer, i.e. the curable resin is present in interstices between the reinforcing fibres or bundles of reinforcing fibres throughout the cross-section of the core layer. It will be appreciated that the term "fully impregnated" does not require that the entire surface area of all reinforcing fibres in the core layer are completely wet-out in the pre-preg prior to curing, only that that the curable resin is dispersed throughout the cross-section of the core layer.

The fibres in a reinforcing fibre layer are preferably in the form of continuous fibres, filaments, tows, bundles, sheets, plies, or combinations thereof. The precise specification of the fibres, for instance their orientation and/or density can be specified to achieve the optimum performance for the intended use of the pre-pregs. Continuous fibres may adopt any of unidirectional (aligned in one direction), multi-directional (aligned in different directions), non-woven, woven, knitted, stitched, wound, and braided configurations. Woven fibre structures may comprise a plurality of woven tows, each tow composed of a plurality of filaments, e.g. thousands of filaments. In further embodiments, the tows may be held in position by cross-tow stitches, weft-insertion knitting stitches, or a small amount of resin binder, such as a thermoplastic resin. In one preferred embodiment, the layer(s) of reinforcing fibres used in the present invention comprise woven fibre structures comprising a plurality of woven tows arranged substantially orthogonally. In a further preferred embodiment, the layer(s) of reinforcing fibres used in the present invention comprise fibre structures wherein the fibres are arranged unidirectionally. In a further preferred embodiment, the layer(s) of reinforcing fibres used in the present invention comprise fibre structures wherein the fibres are arranged in other orientations, such as tri-axial wherein fibres are arranged in three directions, such as 0°, +60°, −60.°

The reinforcing fibres are preferably selected from, but not limited to, fibres of glass (including Electrical or E-glass), carbon (particularly graphite), aramid, polyamide, high-modulus polyethylene (PE), polyester, poly-p-phenylene-benzoxazole (PBO), boron, quartz, basalt, ceramic, and combinations thereof. Carbon fibre is particularly suitable. For the fabrication of high-strength composite materials, e.g. for aerospace and automotive applications, it is preferred that the reinforcing fibres have a tensile strength of greater than 3500 MPa.

The first curable resin may be selected from curable thermosetting resins conventionally known in the art. One or more curable thermosetting resins may be present in the core layer. The formulation of the curable resin can be specified to achieve the optimum performance for the intended use of the pre-pregs. Suitable curable resins may be selected from the group consisting of an epoxy resin, an addition-polymerisation resin (for instance a bis-maleimide resin), a benzoxazine resin, a formaldehyde condensate resin (especially a formaldehyde-phenol or urea-formaldehyde resin), a vinyl ester resin, resins of, 1,3,5-triazine-2,4,6-triamine (melamine), a cyanate resin, an isocyanate resin, a phenolic resin and mixtures of two or more thereof. Preferably the curable resins are selected from epoxy, phenolic or cyanate ester resins, particularly epoxy and phenolic resins, and particularly epoxy resins. An epoxy resin is preferably an epoxy resin derived from the mono or poly-glycidyl derivative of one or more of the group of compounds consisting of aromatic diamines, aromatic monoprimary amines, aminophenols, polyhydric phenols, polyhydric alcohols, polycarboxylic acids and the like, or a mixture thereof. Examples of addition-polymerisation resins are acrylics, vinyls, bis-maleimides, and unsaturated polyesters. Examples of formaldehyde condensate resins are urea, melamine and phenols.

The particularly preferred epoxy resins may be mono-functional, difunctional, or multifunctional epoxy resins. As used herein, the term "multifunctional" epoxy resin is a resin which has a functionality of greater than two. Preferred multifunctional resins are at least trifunctional, typically trifunctional or tetrafunctional, although epoxy resins having greater functionality may also be used, for instance those having 5 or 6 epoxy groups. The term "multi-functional" encompasses resins which have non-integer functionality, for instance epoxy phenol novolac (EPN) resins, as known in the art. The epoxy resin may comprise monofunctional, difunctional and/or multifunctional (typically trifunctional or tetrafunctional) epoxy resins. Preferably the curable resin comprises one or more difunctional epoxy resin(s) (and preferably at least two difunctional epoxy resin(s)) optionally in combination with one or more multifunctional (typically trifunctional or tetrafunctional) epoxy resin(s). In a preferred embodiment, the curable resin comprises one or more difunctional epoxy resin(s) (and preferably at least two difunctional epoxy resin(s)) optionally in combination with one or more trifunctional epoxy resin(s) and/or one or more tetrafunctional epoxy resin(s). In a further preferred embodiment, the curable resin comprises one or more multifunctional epoxy resin(s) (typically trifunctional and/or tetrafunctional).

Suitable difunctional epoxy resins include those based on: diglycidyl ether of Bisphenol F, Bisphenol A (optionally brominated), phenol and cresol epoxy novolacs, glycidyl ethers of phenol-aldehyde adducts, glycidyl ethers of aliphatic diols, diglycidyl ether, diethylene glycol diglycidyl ether, aromatic epoxy resins, aliphatic polyglycidyl ethers, epoxidised olefins, brominated resins, aromatic glycidyl amines, heterocyclic glycidyl imidines and amides, glycidyl ethers, fluorinated epoxy resins, or any combination thereof. Difunctional epoxy resins are preferably selected from diglycidyl ether of Bisphenol F (DGEBF), diglycidyl ether of Bisphenol A (DGEBA), diglycidyl dihydroxy naphthalene, or any combination thereof.

Suitable trifunctional epoxy resins, by way of example, may include those based upon phenol and cresol epoxy novolacs, glycidyl ethers of phenol-aldehyde adducts, aromatic epoxy resins, aliphatic triglycidyl ethers, dialiphatic triglycidyl ethers, aliphatic polyglycidyl ethers, epoxidised olefins, brominated resins, triglycidyl aminophenols, aromatic glycidyl amines, heterocyclic glycidyl imidines and amides, glycidyl ethers, fluorinated epoxy resins, or any combination thereof.

Suitable tetrafunctional epoxy resins include N,N,N',N'-tetraglycidyl diamino diphenylmethane (TGDDM) and N,N,N',N'-tetraglycidyl-m-xylenediamine.

In a preferred embodiment, the curable resin is a mixture of the following epoxy resins:
 (i) a first difunctional epoxy resin component, preferably selected from Bisphenol A epoxy resins, and preferably DGEBA, wherein this first difunctional resin component may be made from a single DGEBA resin or a blend of DGEBA resins differing by their average EEW; and/or
 (ii) a second difunctional epoxy resin component, preferably selected from Bisphenol F epoxy resins, and preferably DGEBF, wherein this first difunctional resin component may be made from a single DGEBF resin or a blend of DGEBF resins differing by their average EEW;

which are preferably in combination with one or more of the following epoxy resin(s):
 (iii) an epoxy phenol novolac (EPN) resin;
 (iv) an epoxy cresol novolac (ECN) resin;
 (v) a trifunctional epoxy resin, preferably triglycidyl aminophenol (preferably triglycidyl para-aminophenol (TGPAP);
 (vi) a tetrafunctional epoxy resin, preferably tetraglycidyl diamino diphenyl methane (TGDDM).

The first and second difunctional epoxy resin components are different difunctional epoxy resins.

Thus, an epoxy resin may be selected from N,N,N',N'-tetraglycidyl diamino diphenylmethane (e.g. grades MY 9663, MY 720 or MY 721; Huntsman); N,N,N',N'-tetraglycidyl-bis(4-aminophenyl)-1,4-diiso-propylbenzene (e.g. EPON 1071; Shell Chemical Co.); N,N,N',N'-tetraglycidyl-bis(4-amino-3,5-dimethylphenyl)-1,4-diisopropylbenzene, (e.g. EPON 1072; Shell Chemical Co.); triglycidyl ethers of p-aminophenol (e.g. MY 0510; Ciba-Geigy); diglycidyl ethers of bisphenol A based materials such as 2,2-bis(4,4'-dihydroxy phenyl) propane (e.g. DE R 661 (Dow), or Epikote 828 (Shell)) and higher molecular weight diglycidyl ethers of bisphenol A based materials such as those with an epoxy equivalent weight of 400-3500 g/mol (e.g. Epikote 1001 and Epikote 1009), and Novolak resins preferably of viscosity 8-20 Pa s at 25° C.; glycidyl ethers of phenol Novolak resins (e.g. DEN 431 or DEN 438; Dow); diglycidyl 1,2-phthalate (e.g. GLY CEL A-100); diglycidyl derivative of dihydroxy diphenyl methane (Bisphenol F) (e.g. PY 306; Ciba Geigy). Other epoxy resin precursors include cycloaliphatics such as 3',4'-epoxycyclohexyl-3,4-epoxycyclohexane carboxylate (e.g. CY 179; Ciba Geigy) and those in the "Bakelite" range of Union Carbide Corporation.

Cyanate ester resins and phenolic resins may be selected from those conventionally used in the art, for instance such as those disclosed in WO-2012/100980-A.

The first curable resin preferably also comprises one or more curing agent(s), as are known in the art, particularly for epoxy resins. Suitable curing agents are disclosed, for example, in EP-A-03 1 1349, EP-A-0486197, EP-A-0365 168 or in U.S. Pat. No. 6,013,730, the disclosures of which are incorporated herein by reference. A catalyst may also be present, as is conventional in the art. Suitable curing agents include anhydrides, particularly poly carboxylic anhydrides, and amines. An amine curing agent suitable has a molecular weight of up to 500 per amino group. An aromatic amine or a guanidine derivative is particularly suitable. Aromatic amines include, for example. 1,3-diaminobenzene, 4,4'-diaminodiphenylmethane. Amine compounds of particular utility as curing agents are the sulphones, e.g. 4,4'-diaminodiphenyl sulphone (4,4' DDS), and 3,3'-diaminodiphenyl sulphone (3,3' DDS). Other curing agents include methylenedianiline; bis(4-amino-3,5-dimethylphenyl)-1,4-diisopropylbenzene (EPON 1062; Shell Chemical Co.); bis(4-aminophenyl)-1,4-diisopropylbenzene (EPON 1061; Shell Chemical Co.); 4-chlorophenyl-N,N-dimethyl-urea (e.g. Monuron); 3,4-dichlorophenyl-N,N-dimethyl-urea (e.g. Diuron™) and dicyanodiamide (Amicure™ CG 1200; Pacific Anchor Chemical). Bisphenol chain extenders, such as bisphenol-S or thiodiphenol, are also particularly useful as curing agents for epoxy resins. Dicyandiamide and it's use with suitable catalysts such as imidazoles and their salts and/or urones such as 2,4-di(N,N-dimethylureido) toluene; 2,6-di(N,N-dimethylureido) toluene (Dyhard™ UR500) are of particularly utility in the present invention.

The first curable resin preferably exhibits a viscosity at 21° C. of less than 500,000 Pa·s, preferably no more than 300,000 Pa·s, preferably no more than 100,000 Pa·s.

The first curable resin preferably exhibits an uncured glass transition temperature (Tg) of less than 8° C., preferably no more than 6° C., preferably no more than 3° C.

The first curable resin preferably exhibits a cure conversion (measured as described herein) of at least 90%, preferably at least 95%, preferably at least 98%, when cured at a cure temperature of at least 100° C., preferably at least 120° C., preferably greater than 120° C., preferably at least 125° C., preferably at least 130° C., and preferably in the range of from about 130° C. to about 150° C., wherein the cure cycle has a duration of no more than 30 minutes, preferably no more than 15 minutes, preferably no more than 10 minutes, preferably no more than 5 minutes. Preferably, the cure conversion is at least 90%, preferably at least 95%, preferably at least 98% when cured at a temperature in the range of from 130° C. to 150° C. for a period of no more than 10 minutes, preferably for a period of no more than 5 minutes.

The curable resin may further contain a relatively minor amount of conventional additives, such as toughening agents, including particulate toughening agents, for instance aggregates such as glass beads, rubber particles and rubber-coated glass beads, filler such as polytetrafluoroethylene, silica, graphite, boron nitride, mica, talc and vermiculite, pigments, nucleating agents, flame retardants such as alumina trihydrate (ATH) and magnesium hydroxide (MDH), and stabilisers such as phosphates. Liquid rubbers having reactive groups may also be used. Thermoplastic toughening additives include polyarylethersulfones (PESs), polysulfones (PSFs), polyvinylformals (PVFs), polymethylmethacrylates (PMMAs), polyimides (PIs), polyetherimides (PEIs) and polyethylene oxides (PEOs). It will be appreciated that, where such additives are present, they are typically added to the pre-preg via their incorporation in the first curable resin. The total amount of said additives in the curable resin is such that said additives constitute typically no more than about 20 wt %, more typically no more than about 10 wt %, by total weight of the core layer.

The core layer preferably comprises from about 40 to about 80 wt % reinforcing fibres, by total weight of the core layer. The core layer preferably comprises from about 20 to about 60 wt % of said first curable resin by total weight of the core layer. The amount of reinforcing fibres plus the amount of said first curable resin (which includes the optional additives described hereinabove) should equal 100 wt % of the core layer.

Preferably, the core layer exhibits an areal weight of from about 200 to about 1500 g/m$^2$, preferably from about 300 to about 1400 g/m$^2$, preferably from about 400 to about 1100 g/m$^2$ preferably from about 600 to about 1100 g/m$^2$. It will be understood that the areal weight of the core layer includes the weight of the reinforcing fibres and the first curable resin (and any optional additives contained therein).

Preferably, the thickness of the core layer is no more than about 1000 μm, preferably no more than about 500 μm, preferably at least about 130 μm, preferably at least about 250 μm, preferably at least about 400 μm, preferably from about 400 μm to about 500 μm.

The core layer of the pre-preg is manufactured by any suitable technique known in the art, such that the curable resin is contacted with the fibrous reinforcing agent in one or more of the forms noted above under conditions of temperature and pressure sufficient to cause the curable resin to flow and infuse or impregnate the fibres. The term "impregnate" refers to the introduction of a curable resin composition to reinforcement fibres so as to introduce the curable resin between the interstices of the fibres and/or fully or partially encapsulate the fibres. Thus, the pre-preg is prepared by the general method of:

a. providing a dry fibre preform comprised of one or more layers of reinforcing fibres;
b. impregnating said dry fibre preform with a first curable resin, wherein said first curable resin is liquid.

In general terms, the dry fibre preform is impregnated with the curable resin by heating the curable resin to its molten state and disposing said molten first curable resin on and into said dry fibre preform. Typical impregnating methods include:

(1) Continuously moving the reinforcing fibres through a bath of solvated resin composition to fully or substantially fully wet out the fibres; followed by the application of heat to evaporate the solvent; or
(2) Pressing top and/or bottom resin films against a web of reinforcing fibres under elevated temperature.

Preferably, the core layer is prepared by the hot-melt casting technique, particularly wherein low permeability is desired.

The resulting core layer is typically a pliable and tacky sheet of material.

The Surface Layer

The surface layer preferably has an areal weight of from about 5 to about 100 g/m$^2$, preferably from about 20 to about 60 g/m$^2$, more preferably about 25 to 50 g/m$^2$.

The surface layer preferably has a thickness of no more than about 85 μm, preferably from about 4 μm to about 85 μm, preferably from about 15 μm to about 50 μm, preferably from about 20 μm to about 45 μm.

Preferably, the surface layer does not comprise reinforcing fibres.

The surface layer comprises a second curable resin. Preferably, the second curable resin is present in the surface layer in amount of at least 80 wt %, by total weight of the surface layer, with the balance of the surface layer optionally comprising conventional additives.

The second curable resin is preferably independently selected from one or more of the thermosetting resin(s) described hereinabove for the first curable resin. The preferred second curable resins are the preferred epoxy resins described hereinabove, and the disclosure hereinabove of those preferred epoxy resins is applicable equally to the second curable resin. The second curable resin preferably comprises thermosetting resin(s) with a relatively higher molecular weight, compared to the molecular weight of the resin(s) of the first curable resin.

The second curable resin preferably exhibits a viscosity at 21° C. of at least 500,000 Pa·s, preferably at least about 1,000,000 Pa·s, preferably at least about 5,000,000 Pa·s.

The second curable resin preferably exhibits an uncured glass transition temperature (Tg) of at least 8° C., preferably at least 12° C., and typically no more than 30° C.

The surface layer may also comprise one or more curing agent(s), as described hereinabove for the core layer.

The second curable resin may exhibit cure conversion characteristics as described for the first curable resin.

Alternatively, the second curable resin may be a relatively slower curing resin by itself and instead may rely on the diffusion of the curatives from the first curable resin to ensure that the pre-preg cures within the cure cycles described herein.

The Pre-Preg

The pre-preg described herein preferably comprises from about 40 to about 80 wt %, preferably from about 40 to 75 wt %, preferably from about 45 to about 70 wt %, preferably from about 55% to about 70 wt %, preferably from about 58 to about 68 wt % and preferably from about 58 to about 64 wt % reinforcing fibres, by total weight of the pre-preg. The laminar pre-preg preferably comprises from about 20 to about 60 wt %, preferably from about 25 to about 60 wt %, preferably from about 30 to about 55 wt %, preferably from about 30% to about 45 wt %, and more preferably from about 32 to about 42 wt %, more preferably from about 36 to about 42 wt % of curable resin (i.e. the first and second curable resins) by total weight of the laminar pre-preg. The amount of reinforcing fibres plus the amount of curable resin should equal 100%. The more and most preferred resin fractions are particularly advantageous for achieving the desired permeability characteristics described herein.

The pre-preg described herein preferably exhibits a low permeability to air. Such pre-pregs have been found to be particularly advantageous wherein the prehensile force is vacuum, i.e. wherein the astrictive end-effector is or comprises a suction cup. The pre-preg preferably exhibits a permeability to air such that a 100×100 mm sample of the pre-preg is retained for at least 60 seconds by a silicone suction cup of external diameter 22 mm and working internal diameter 20 mm exerting a vacuum level defined by an open flow-rate of 20 liters/min prior to contact with the surface of the pre-preg.

Preferably, the permeability to air is such that the flow rate through the pre-preg is no more than 18 liters/min, and preferably no more than 15 liters/min, measured when the pre-preg has been retained for 60 seconds by a silicone suction cup of external diameter 22 mm and working internal diameter 20 mm exerting a vacuum level defined by an open flow-rate of 20 liters/min prior to contact with the surface of the pre-preg.

Additionally, the prepreg described herein can also be measured for air permeability according to ASTM D737-04. The air permeability of the prepreg measured according to ASTM D737-04 is preferably no more than 4 $cm^3/s/cm^2$, preferably no more than 1 $cm^3/s/cm^2$, preferably no more than 0.1 $cm^3/s/cm^2$, and preferably no more than 0.01 $cm^3/s/cm^2$.

The air permeability is measured at ambient temperature, i.e. a temperature from about 15 to about 30° C., more typically 18 to about 23° C., and preferably 20° C. It will be appreciated that the permeability is measured in this way prior to curing of the pre-preg in the process of the present invention, i.e. the permeability is the permeability of the pre-preg that is disposed into or onto the mould in step (b) of the process.

As described herein, the surface of the pre-preg exhibits low tack. Preferably, the tack of the surface of the pre-preg is such that, after a 100×100 mm sample of the pre-preg has been retained for 60 seconds by a silicone suction cup of external diameter 22 mm and working internal diameter 20 mm exerting a vacuum level defined by an open flow-rate of 20 liters/min prior to contact with the surface of the pre-preg, the pre-preg sample drops from the suction cup within a period of no more than 1 second after discontinuation of the vacuum. The tack is measured in this way at ambient temperature, i.e. a temperature from about 15 to about 30° C., more typically 18 to about 23° C., and preferably 20° C. It will be appreciated that the tack is measured in this way prior to curing of the pre-preg in the process of the present invention, i.e. the tack is the tack of the pre-preg that is disposed into or onto the mould in step (b) of the process.

The pre-preg is preferably flexible at ambient temperature (preferably at 20° C.) in its uncured state. The prepreg described herein can be measured for stiffness according to ASTM D1388-96 option A. Preferably the prepreg has a bending length no more than 250 cm, preferably no more than 200 cm and preferably no more than 150 cm, measured according to ASTM D1388-96 option A. In another embodiment, preferably the prepreg has a bending length no more than 175 cm, preferably no more than 150 cm, and preferably no more than 125 cm, measured according to ASTM D1388-96 option A.

The pre-preg may be prepared by any conventional technique in the art. Typically, the surface layer is pre-formed (or pre-coated) by casting the resin composition onto a release paper in accordance with conventional techniques, for instance using a reverse roll coater at a suitable temperature, typically in the range of from about 50 to about 100° C. The surface layer may then be disposed onto one or both surfaces of the core layer, i.e. the impregnated dry fibre preform described hereinabove.

Preferably, a surface layer is disposed on both surfaces of the core layer.

The Automated Process for Preparing a Moulded Article

To form a moulded article, a plurality of pre-pregs is laid up into or onto a mould (often referred to as moulding tool) in a stacking arrangement to form a "pre-preg lay-up". The pre-preg plies within the lay-up may be positioned in a selected orientation with respect to one another. For example, pre-preg lay-ups may comprise pre-preg plies having uni-directional fibre arrangements, with the fibres oriented at a selected angle θ, e.g. 0°, 45°, or 90°, with respect to the largest dimension (typically defined as the length) of the lay-up. Once in place, the pre-pregs in the lay-up are cured as described hereinbelow.

According to the present invention, the layup process is an automated process.

The laminar pre-preg is preferably provided in the form of a wound roll of the pre-preg material (typically wound around a core of cardboard or other suitable material). The automated process of the present invention typically therefore comprises the step of unwinding the pre-preg material onto a flat and level base, suitably securing the pre-preg material in position by a suitable securing means as is conventional in the art. One or more pre-determined shapes are then cut from the web of pre-preg material, suitably using a mechanised and automated cutting means as is known and conventional in the art. One suitable cutting means is a high-frequency rotationally operating oscillating saw blade. During the cutting step, the web of pre-preg may be supported and retained in place by a suitable retaining member. The pre-determined cut shape remains in the plane of the web of the remaining pre-preg material, and the location of the pre-determined cut pre-preg shape at this point in the process typically defines said starting position.

The pre-preg (or the pre-determined cut pre-preg shape) is then conveyed by an automated conveying member from said starting position to a finishing position in or on the mould. Optionally, the cut pre-preg shape may be conveyed from said starting position to an intermediate position between said starting and finishing positions, for instance to a stacking position where the cut pre-preg shapes are stacked or wherein the cut pre-preg shapes are deposited in or on a release film or lay-up mould or mould loading device, and then conveyed from the intermediate position to said finishing position in or on said mould. Lamination of the pre-pregs may suitably be effected at said intermediate position, particularly wherein the cut pre-preg shapes are deposited in or on a release film or lay-up mould. Alternatively, a cut pre-preg shape may be conveyed directly from said starting position to said finishing position, which may further improve the speed and efficiency of the process.

The automated conveying member grasps the pre-preg material by applying a prehensile force thereto.

As used herein, the term "prehensile force" refers to any grasping force, including but not limited to application of force on a plurality of surfaces of the pre-preg material (i.e. wrapping round). Preferably, the prehensile force is selected from one or more (and preferably from only one) of vacuum, magneto-adhesion and electro-adhesion, and preferably said prehensile force is vacuum. Preferably, the term "prehensile force" refers to the application of force on a single surface of the pre-preg material. The prehensile force may act at a single attachment point on the surface of the pre-preg material or may act simultaneously at a plurality of attachment points on the surface of the pre-preg material. Where the prehensile force acts at a plurality of attachment points on the surface of the pre-preg material, then said plurality of attachment points are located on a single surface of the pre-preg material.

Thus, according to the present invention, the laminar pre-preg is preferably conveyed from said starting position to said finishing position by the application of suction to one or more attachment points of a surface (preferably a single surface) of the pre-preg material.

After the pre-preg material has been conveyed to said finishing position by said automated conveying member, the prehensile force is discontinued.

The conveying sequence is then repeated for one or more further laminar pre-preg(s).

After the desired or pre-determined number of pre-pregs has been laid in or on the mould, the pre-pregs are typically compressed by a mould press, so that the plurality of pre-pregs is in contact with the desired and appropriate moulding surface(s) of the mould, for instance in a mould cavity. The moulding surfaces of the mould are preferably heated, preferably isothermally heated. Thus, preferably the plurality of pre-pregs is compressed in a press-moulding process where the mould tool is at a fixed temperature, which is referred to in the art as isothermal tooling. The temperature of the moulding surfaces of the mould, or of the mould tool, is fixed at a pre-determined temperature to cure the pre-pregs. The pre-pregs are heated rapidly, and as quickly as the mould tool allows.

The automated conveying member is suitably a pivoted or articulated robot arm which is movable (including rotational movement) along multiple axes or dimensions.

Preferably, the automated conveying member comprises one or more astrictive end effector(s) to convey said pre-preg. Preferably the automated conveying member comprises one or more suction cup(s) to convey said pre-preg. The suction cups may be of any suitable shape, and typically present a substantially circular contact surface to the pre-preg. A suction cup typically contacts the pre-preg over a surface of the pre-preg which has an area having a largest dimension (typically a diameter) of from about 1 cm to about 10 cm; it will be appreciated that this area is the area prescribed by the outer periphery or circumference of a suction cup. The astrictive end-effector(s) or suction cup(s) are connected to a vacuum source by any suitable hose arrangement.

The automated process of the present invention is preferably a robotic pick-and-place process, for which automated machines and control systems are already known in the art. US-2005/0042323, for example, discloses an automated process for handling conventional resin composite materials using a plurality of vacuum grippers.

One of the advantages of the present invention is that the pre-preg does not require (and indeed does not comprise or is not otherwise associated with) a protective removable interleave disposed on an external surface of the pre-preg. Thus, it will be appreciated that the automated process does not comprise a step of removing a protective removable interleave from a surface of the pre-preg.

A further advantage of the present invention is that the surfaces of the pre-preg material are tack-free at ambient temperature. The automated process of the present invention does not therefore require (and indeed does not involve a step which comprises) the removal of residual resin from the surfaces of the automated conveying member which have contacted and conveyed the pre-preg material.

The automated process is preferably conducted in an environment at ambient temperature or above, and preferably at ambient temperature. In this context, the "ambient temperature" is the temperature of the surrounding atmosphere within the manufacturing facility, in whichever climate that may be located, and typically refers to a temperature in the range of from about 15 to about 30° C., more typically 18 to about 23° C., and typically about 20° C. It will be appreciated that the term "conducted in an environment at ambient temperature" does not refer to the localised temperature increases associated with the curing cycle described hereinbelow.

After the desired or pre-determined number of pre-pregs has been laid in or on the mould, the plurality of pre-pregs are cured, preferably thermally cured. Curing is preferably effected while the pre-pregs are located in or on the mould, and preferably while the pre-pregs are compressed in a mould cavity, preferably a heated mould-cavity, preferably an isothermally heated mould cavity. Thus, as described above, curing is preferably effected in a press-moulding process where the mould tool is at a fixed temperature (isothermal tooling).

In the present invention, thermal curing is conducted at a cure temperature of at least 100° C., preferably at least 120° C., preferably greater than 120° C., preferably at least 125° C., preferably at least 130° C., and preferably in the range of from about 130° C. to about 150° C. Preferably, thermal curing is conducted using a cure cycle having a duration of no more than 30 minutes, preferably no more than 15 minutes, preferably no more than 10 minutes, preferably no more than 5 minutes. The cure cycle duration as defined herein is the period for which the plurality of pre-pregs is subjected to the pre-determined cure temperature. The cure cycle duration does not include the ramp phase or the cool-down phase. As noted hereinabove, the present invention is primarily directed to press-moulding processes where the mould tool is at a fixed temperature (isothermal tooling), and heats the pre-pregs as rapidly as possible.

In an alternative embodiment, thermal curing may be conducted in an oven or autoclave, and may be conducted under vacuum (for instance in a vacuum bag as known in the art), suitably conducted at elevated pressure, for instance at a pressure of from about 2 to about 10 bar. In this embodiment, the cure temperatures and cure cycle durations described hereinabove are also applicable, but typically the heating and cooling rates are controlled. Preferably, the heating rate during the ramp phase is from about 1 to about 5° C./min, preferably from about 1 to about 3° C./min. Preferably, the cooling rate in the cool-down phase is from about 1 to about 5° C./min, preferably from about 1 to about 3° C./min to 60° C.

The process further comprises the step of removing the moulded cured pre-preg(s) from the mould to provide the moulded article.

In the automated process of the present invention, it will be appreciated that the surface layer remains associated with and part of the fibre-reinforced composite material during and after curing. Preferably, the first and second curable resins are miscible, such that the resins will at least partially diffuse into each other during curing.

Applications

The moulded articles prepared by the process described herein are particularly suitable as components for transport applications, and particularly the automotive industry. The automotive components prepared by the present invention are particularly suitable as mid- or high-volume automotive parts, in which cost and speed of production are paramount. The present invention provides a process in which the cutting and handling of pre-preg materials is greatly simplified, providing advantages of efficiency and economy. The lay-up time according to the present invention is significantly reduced, allowing a reduction in the unit cost per component and/or allowing the high volume of component production desired in the automotive industry.

Various embodiments of the invention are described herein. It will be recognised that features specified in each embodiment may be combined with other specified features to provide further embodiments.

Measurement Methods

The pre-pregs described herein were characterised as follows.

Tack-Free

The samples were qualitatively assessed for tack by the following test. Two 100×100 mm squares were cut out of the final pre-preg and stacked on top of one another. A 1 kg weight was applied evenly across the area of the two-ply assembly and allowed to rest for 1 minute before removal. This experiment was performed at an ambient temperature of 20° C. On removal of the weight, the two plies were separated and the degree of adhesion assessed. If the two plies separated immediately, with no adhesion between them, the pre-preg was considered to be tack-free.

Vacuum Cup Performance

Unless otherwise stated, the permeability and tack performance of the pre-preg when conveyed by a vacuum cup was assessed in the following multi-part test, conducted at ambient temperature (i.e. a temperature from about 15 to about 30° C., more typically 18 to about 23° C., and preferably 20° C.).

Figure 2:
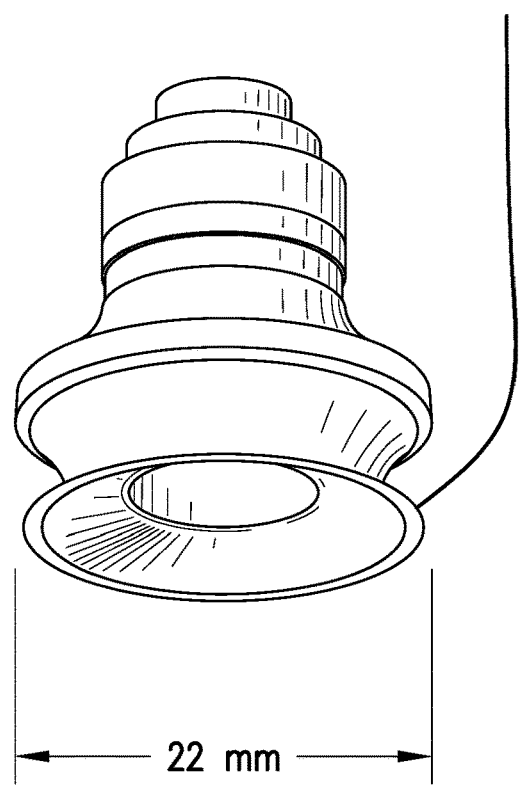
FIGS. 2 and 3 illustrate the suction cup used in the Vacuum Cup Performance test.
Figure 3:
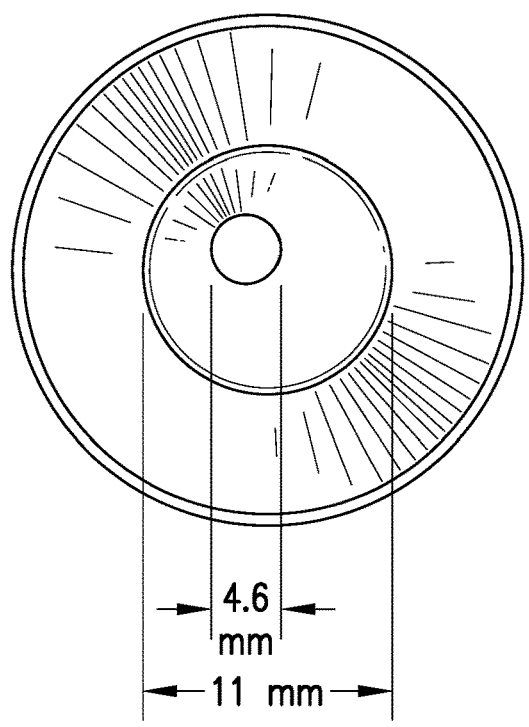

Part (i): The permeability of the pre-preg was tested by contacting a silicone bellow suction cup (model B20; available from Piab, UK) with the surface layer of the pre-preg (sample size 100×100 mm). The suction cup, which is illustrated in FIGS. 2 and 3, had an external diameter of 22 mm and a working internal diameter of 20 mm. The external and internal diameters are those of the suction cup in the uncompressed state, and are measured at the end of the suction cup which contacts the pre-preg (i.e. the proximal end, relative to the point of contact with the pre-preg) and in the plane defined by the contact area with the pre-preg. The suction cup had a wall thickness of 1 mm. The narrowest part of the bellow of the suction cup was 11 mm. The suction cup was attached to a vacuum pump via an aperture of approximately 4.6 mm located at the distal end of the suction cup relative to the point of contact with the prepreg. The suction cup exerted a vacuum level defined by an open flow-rate of 20 liters/min prior to contact with the surface of the pre-preg, to assess whether the suction cup could hold the weight of sample for a period of 60 seconds. The permeability was graded as follows:

Good vacuum hold: the sample was held by the suction cup

Poor vacuum hold: the sample could not be retained by the suction cup

The pre-pregs of utility in the present invention should exhibit a good vacuum hold.

Part (ii): For pre-pregs which exhibited a good vacuum hold, the vacuum supply was then removed to assess the release of the sample from the suction cup, and hence to provide a measure of the tack of the pre-preg surface. The release performance was graded as follows:

Grade 1—Good release; sample does not stick to vacuum cup and drops immediately on discontinuation of the vacuum, or within 1 second after discontinuation of the vacuum Grade 2—Poor release; sticks slightly to vacuum cup; delayed drop on removal of vacuum Grade 3—Very poor release; sticks to vacuum cup on removal of vacuum The pre-pregs of utility in the present invention should exhibit a release of Grade 1.

With reference to FIG. 1, the procedure of the test was as follows. The sample (10) to be tested is placed on trestle table (9) which is movable in the vertical direction. With valves A and B (2, 5) closed and valve C (6) open, vacuum pump (1) is switched on, valve A (2) is opened and the open flow rate set to 20 liters/min using flow-meter (3). The trestle table (9) is raised so that the sample (10) is contacted with suction cup (7). The trestle table (9) is lowered away from suction cup (7) to determine whether suction cup (7) held the weight of the sample for 60 seconds. A sample which is not able to be lifted from the trestle table by the suction cup is too permeable and/or too tacky for utility in the present invention. If the sample remains in contact with the suction cup for 60 seconds, the vacuum level at 60 seconds is recorded via vacuum gauge (4) and the flow rate at 60 seconds is recorded at flow-meter (3), i.e. with the sample (10) blocking the opening in order to assess the permeability of the sample. A higher flow rate indicates a higher permeability. The flow rate measured at flow-meter (3) at 60 seconds is preferably no more than 18 liters/min, and preferably no more than 15 liters/min, for the pre-preg to have utility in the present invention, since otherwise the pre-preg is too permeable. Valve A (2) is then closed and the vacuum vented by opening valve B (5), and the time for the sample to release from the suction cup is recorded. The in-line distance (i.e. piping length) between cup (7) and cup (8) is approximately 30 cm. A pre-preg sample should have a release time of no more than 1 second after discontinuation of the vacuum for utility in the present invention, otherwise the pre-preg is too tacky.

In a modified version of the vacuum cup performance test, the open flow rate may be set to 50 liters/min and the sample (10) offered to the suction cup as before. For those samples which were held by suction cup (7) for at least 60 seconds, the flow rate at flow-meter (3) is measured at 60 seconds, i.e. with the sample (10) blocking the opening in order to assess the permeability of the sample. The time for the sample to release from the suction cup can be recorded by closing valve A (2) and venting the vacuum by opening valve B (5).
Air Permeability According to ASTM D737-04

The air permeability of the prepreg was additionally measured according to ASTM D737-04 at 20° C. using a Shirley Air Permeability tester, and using a 1 inch (approximately 2.54 cm) diameter orifice (i.e. a test area of 5.07 $cm^3$), and a water pressure differential of approximately 125 Pa.
Viscosity The viscosity of the resins was measured, at 21° C. unless otherwise stated, by following ASTM D4440: using a 25 mm diameter parallel plate, with a strain of 1%, a frequency of 1 Hz and a gap of 500 μm (for viscosities below 500,000 Pa·s): or using a 8 mm diameter parallel plate, with a strain of 1%, a frequency of 1 hz and a gap of 1000 μm. (for viscosities over 500,000 Pa·s).
Glass Transition Temperature The uncured glass transition temperature, $T_g$, of the resins was measured by differential scanning calorimetry (DSC) at a heating rate of 10° C. per minute, according to ISO 11357-2:2013.
Cure Conversion Differential Scanning calorimetry (DSC) was utilized to determine the cure conversion under a given set of cure conditions, substantially in accordance with ISO-11357-5: 2013. The residual enthalpy (remaining heat of reaction) detected during the DSC measurement is correlated to the total enthalpy (heat evolved) of the curing reaction. DSC measurements are performed by heating from 30° C. to a temperature that is sufficient to capture the entire curing reaction (225° C. is sufficient for the resins of interest described herein) at a heating rate of 10° C./min. The sample size is about 5-10 mg. The cure conversion (%) is calculated as:

$$\text{cure conversion (\%)} = \frac{(\Delta Hi - \Delta He)}{\Delta Hi} \times 100$$

wherein:
ΔHi is the enthalpy generated by the uncured test sample during heating from 30° C. to 225° C.;
and
ΔHe is the enthalpy generated by a cured sample during the heating scan of heated from 30° C. to 225° C.
Flexibility Flexibility of the pre-preg was evaluated qualitatively by assessing the resistance to winding the pre-preg at an ambient temperature of 20° C. onto a cardboard core with an outer diameter of 4 inches (approx. 10.16 cm). In addition, the pre-preg flexibility may also qualitatively assessed by subjecting it to a 180° fold test and the fibre breakage assessed visually under magnification.

In addition, the prepreg was also measured for stiffness using ASTM D 1388-96, option A—Cantilever test at an ambient temperature of 20° C., using a specimen size of 350×25 mm (i.e. longer than the standard specimen length of 200 mm).

The invention is further illustrated with reference to the following non-limiting examples.

EXAMPLES

Example 1

A conventional tacky epoxy resin composition (A) having a viscosity of 85,000 Pa·s at 21° C. and an uncured Tg of 0° C. was used as the first curable resin as defined herein. A pre-preg intermediate (A) was prepared by impregnating a carbon fibre fabric (TC383 available from Sigmatex; 2×2 twill weave; areal weight 660 g/m²) with 330 g/m² of resin composition (A) via a conventional hot-melt manufacturing process with an impregnation temperature of 75° C.

A resin composition (B) having the ingredients shown in Table 1 below was used to manufacture a 35 g/m² film on a reverse roll coater with a coating temperature of 75° C. The resin film was cast onto a release paper in accordance with conventional techniques. Resin composition (B) had a viscosity of 8,400,000 Pa·s at 21° C. and an uncured Tg of 14.5° C., measured as described herein.

TABLE 1

| Resin Composition (B) | |
| --- | --- |
| Ingredient | wt % |
| Araldite GT7071 (Unmodified Bisphenol A "Type 1" solid epoxy resin, available from Huntsman) | 40 |
| Araldite EPN1138 (Epoxy phenol novolac resin, available from Huntsman) | 42 |
| Araldite LY1556 (Diglycidyl ether of bisphenol-A, available from Huntsman) | 8 |
| YD 50 (phenoxy resin; thermoplastic toughener) | 6 |
| Dicyandiamide (curing agent) | 3.8 |
| 3,3'-(4-methyl-1,3-phenylene)bis(1,1-dimethylurea) | 2.2 |

The film of resin composition (B) is used as the surface layer of the present invention. Thus, a 35 g/m² film of resin composition (B) was attached and consolidated onto each surface of pre-preg intermediate (A) using conventional pre-preg manufacturing equipment at a temperature of 50° C. to give the final pre-preg. The final pre-preg contained an overall ratio of 38% resinous material to 62% of fibrous material (i.e. 38% resin weight or 38% RW). The release paper was not present in the final pre-preg (its purpose being for the manufacture of the surface layer of resin composition (B)).

The final pre-preg exhibited excellent flexibility. For instance, it was able to be wound onto a cardboard core with an outer diameter of 4 inches (approx. 10.16 cm) without any noticeable resistance at an ambient temperature of 20° C. In addition, the final pre-preg was able to be tightly folded over onto itself without displaying any fibre breakage at the 180° fold. Additionally, when tested to ASTM D 1388-96, option A—Cantilever test at an ambient temperature of 20° C., the bending length was found to be 175 mm. The pre-preg was cut such that the warp direction of the fabric was parallel to the test direction.

The final pre-preg was qualitatively assessed for tack according to the test described hereinabove. After removal of the weight, the two plies were not adhered to each other.

The final pre-preg was also tested for vacuum cup performance according to the test described hereinabove. The pre-preg exhibited a good vacuum hold and was released immediately upon removal of the vacuum.

Figure 4:
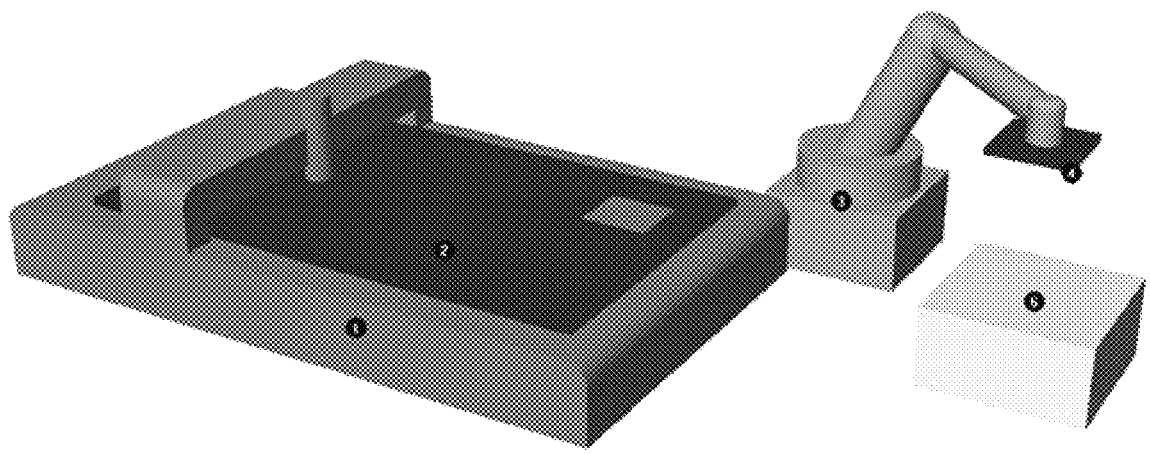
FIG. 4 illustrates the automated test manufacturing facility.

The sample was then tested in an automated manufacturing test facility. See FIG. 4 for equipment arrangement. When rolling/unrolling the sample (2), the pre-preg was easily unrolled, with no self-adhesion. An automated cutter (1) was used to cut preform shapes from the sample, and the material cut cleanly. A 125 mm square sample (4) was cut by an automated cutter and a robotic pick and place arm actuator with a suction cup end-effector (3) used for lay-up of the sample in a mould (5); the sample was released cleanly.

Comparative Examples 1 to 4

A series of pre-pregs were prepared as described in Table 2, using a 38% RW unless otherwise stated. Comparative Examples 1 and 2 comprised a core layer which was the fibre-reinforced resin-impregnated core layer of Example 1, and on each side thereof a surface layer not according to the present invention. Comparative Examples 3 and 4 did not comprise surface layers, and were made from a conventional fibre-reinforced resin-impregnated pre-preg in which the resin did not exhibit the characteristics of the second curable resin according to the present invention. The pre-pregs were tested for their vacuum cup performance as described herein.

TABLE 2

Comparative Examples and Vacuum Cup Performance

| Comparative Example | Composition | Vacuum hold | Release |
|---|---|---|---|
| Comp. Ex. 1 | Core Layer: As Example 1<br>Surface Layer: Araldite GY280 (75 g) + Araldite EP820 (25 g) | Good | >1 second delay |
| Comp. Ex. 2 | Core Layer: As Example 1<br>Surface Layer: Araldite GY280 (75 g) + Araldite GT6071 (25 g) | Good | No release |
| Comp. Ex. 3 | 650 g/m² 2 × 2 twill weave fabric impregnated with Cycom759F; solvent method | Poor | n/a |
| Comp. Ex. 4 | 245 g/m² 2 × 2 twill weave fabric impregnated (at 42% RW) with MTM 49-3; hot melt method | Poor* | n/a |

Araldite GY280 diglycidylether of bisphenol A resin available from Huntsman
Araldite EP820 resin available from Huntsman
Araldite GT6071 solid bisphenol-A epoxy resin available from Huntsman
Cycom759F and MTM 49-3 resins available from Cytec
*too much tack to lift the sample from the surface of the trestle table Example 1 and Comparative Examples 3 and 4 were further assessed in the vacuum cup performance test described hereinabove (using an open flow rate of 50 liters/min) by measuring the flow rate at 60 seconds at flow-meter (3) with the sample blocking the opening in order to assess the air permeability of the sample. The results are in Table 3 below.

TABLE 3

Modified Vacuum Cup Performance Test

| Sample | Flow rate after 1 minute |
|---|---|
| Example 1 | <14 litres/min |
| Comparative Example 3 | 24 litres/min |
| Comparative Example 4 | 35 litres/min |

The results in Table 3 demonstrate the low permeability of the pre-preg of the present invention.

Example 2

A unidirectional tape of carbon fibre with an areal weight of 150 g/m² was impregnated with 64 g/m² of the resin composition (A) used in Example 1 using conventional equipment for the manufacture to give unidirectional pre-preg intermediate (B). The unidirectional pre-preg intermediate (B) was cut in the manner described in FIG. 4 of WO-2007/135418-A1 with a pattern of parallel cuts at an angle of about 45° to the length of the unidirectional fibres. The cuts were all of substantially the same length (approx. 20 mm).

Pre-preg intermediate (C) was prepared and cut using the same process and materials as pre-preg intermediate (B), except that the unidirectional carbon fibre tape was impregnated with 84 g/m² of resin composition A.

A four layer construction was then prepared by laminating the plies of intermediate pre-preg in the following order:

Pre-preg intermediate B—with the ply oriented such that the fibres are aligned at 0°;

Pre-preg intermediate C—with the ply oriented such that the fibres are aligned at 90°;

Pre-preg intermediate C—with the ply oriented such that the fibres are aligned at 0°;

Pre-preg intermediate B—with the ply oriented such that the fibres are aligned at 90°.

A 25 g/m² film was prepared of the resin composition (B) used in example 1, which was then attached and consolidated onto each surface of the four layer construction comprising pre-preg intermediates B and C using conventional pre-preg manufacturing equipment at a temperature of 50° C. to give the final pre-preg. The final pre-preg contained an overall ratio of 37% resinous material to 63% of fibrous material (37% RW).

The final pre-preg was qualitatively assessed for tack according to the test described hereinabove. After removal of the weight, the two plies were not adhered to each other.

The final pre-preg exhibited excellent flexibility, similar to that of Example 1.

Example 3

A pre-preg was prepared according to Example 1 except that the surface layer was a 50 g/m² film of resin composition (C) as defined in Table 4 below. The film was manufactured on a reverse roll coater with a coating temperature of 60° C., cast onto a release paper and aged for 5 weeks at 20° C. Resin composition (C) exhibited an uncured Tg of 14.5° C. and a viscosity at 21° C. of greater than 500,000 Pa·s.

TABLE 4

| Resin Composition (C) | |
| --- | --- |
| Ingredient | wt % |
| Araldite EPN1138 | 52.1 |
| Araldite GT7071 | 13.4 |
| Araldite LY1556 | 17.6 |
| Nanostrength M22N (block copolymer toughening agent) | 4.2 |
| Dicyandiamide | 4.2 |
| 3,3'-(4-methyl-1,3-phenylene) bis (1,1-dimethylurea) | 2.5 |
| 1,3,5-triazine-2,4-diamine,6-[2-(2-methyl-1H-imidazol-1-yl)ethyl] | 0.8 |
| Methylhexahydrophthalic Anhydride | 5 |

The final pre-preg had an overall resin weight of 38%, and demonstrated very similar tack and flexibility characteristics to that of Example 1.

The results demonstrate that a pre-preg according to the present invention is able to be handled in a pick-and-place automated process at ambient temperature without the use of a polymeric interleave.

Comparative Example 5

For comparison to Example 1, a pre-preg was prepared by impregnating the same carbon fibre fabric (TC383 available from Sigmatex; 2×2 twill weave; areal weight 660 g/m$^2$) with a total of 400 g/m$^2$ of resin composition (B) only. The pre-preg contained an overall ratio of 38% resinous material to 62% of fibrous material. To make the prepreg, a 200 g/m$^2$ layer of resin was applied to both faces of the fabric and impregnated via conventional hot-melt manufacturing processes. Comparative example 5 did not contain surface layers of resin.

When tested to ASTM D 1388-96, option A—Cantilever test at an ambient temperature of 20° C., the bending length for comparative example 5 was found to be 275 mm. The prepreg was cut such that the warp direction of the fabric was parallel to the test direction. This bending length is 100 mm greater than example 1 demonstrating that this prepreg is significantly less flexible than Example 1.

Example 4

A pre-preg was prepared according to Example 1 except that the surface layer was a 50 g/m$^2$ film of resin composition (D) as defined in Table 5 below. Resin composition (D) exhibited an uncured Tg of 16° C. and a viscosity at 21° C. of approximately 20,000,000 Pa·s.

TABLE 5

| Resin Composition (D) | |
| --- | --- |
| Ingredient | wt % |
| Araldite LY1556 | 18.18 |
| Araldite ECN1273 | 77.27 |
| Dicyandiamide | 4.55 |

Araldite ECN1273 solid epoxy cresol novolac resin available from Huntsman

The final pre-preg had an overall resin weight of 38%, and demonstrated very similar tack and flexibility characteristics to that of Example 1.

The prepreg was found to have a bending length of 241 mm when measured for stiffness according to ASTM D1388-96, option A at 20° C. The prepreg was cut such that the warp direction of the fabric was parallel to the test direction.

The final pre-preg was qualitatively assessed for tack according to the test described hereinabove. After removal of the weight, the two plies were not adhered to each other.

The final pre-preg was also tested for vacuum cup performance according to the test described hereinabove. The pre-preg exhibited a good vacuum hold and was released immediately upon removal of the vacuum.

Comparative Example 6

A pre-preg was prepared according to Example 1 except that the surface layers were 50 g/m$^2$ films of resin composition (E) as defined in Table 6 below. Resin composition (E) exhibited an uncured Tg of 8° C.

TABLE 6

| Resin Composition (E) | |
| --- | --- |
| Ingredient | wt % |
| Araldite LY1556 | 56 |
| Araldite GT6099 | 44 |

The final pre-preg had an overall resin weight of 38%. The final pre-preg was qualitatively assessed for tack according to the test described hereinabove. After removal of the weight, the two plies had adhered to each other.

The invention claimed is:

1. An automated process for preparing a moulded article from a plurality of pre-pregs comprising the steps of:
    (a) providing a mould;
    (b) disposing a laminar pre-preg into or onto said mould by an automated conveying member which applies a prehensile force to said pre-preg to convey said pre-preg from a starting position to a finishing position in or on said mould;
    (c) repeating step (b) at least once to dispose one or more further pre-pregs into or onto said mould;
    wherein said laminar pre-preg is a fibre-reinforced curable composite material, wherein said pre-preg comprises a core layer having a first surface and a second surface and further comprises a surface layer disposed directly on at least one surface of said core layer,
    wherein said core layer comprises one or more layer(s) of reinforcing fibres impregnated with a first curable resin, which exhibits a viscosity at 21° C. of less than 500,000 Pa·s and/or an uncured glass transition temperature (Tg) of less than 8° C. as measured by differential scanning calorimetry (DSC) at a heating rate of 10° C. per minute, and wherein said surface layer comprises a second curable resin, which exhibits a viscosity at 21° C. of at least 500,000 Pa·s and/or an uncured glass transition temperature (Tg) of at least 8° C. as measured by DSC at a heating rate of 10° C. per minute; and
    wherein the prehensile force is applied by said automated conveying member directly to the external surface of said surface layer of said pre-preg.

2. The automated process of claim 1 wherein said prehensile force is selected from vacuum, magneto-adhesion and electro-adhesion.

3. The automated process of claim 2 wherein said automated conveying member comprises an astrictive end effector to convey said prepreg from said starting position to said finishing position in or on said mould, optionally wherein said pre-preg is conveyed from said starting position to an intermediate position between said starting and finishing positions, wherein said intermediate position is a stacking position where said pre-preg is stacked or wherein said intermediate position is a position where said pre-preg is deposited in or on a release film or lay-up mould or mould loading device, and wherein said pre-preg is then conveyed from the intermediate position to said finishing position in or on said mould.

4. The automated process of claim 3, wherein steps (b) and (c) are conducted in an environment at ambient temperature in the range of 18° C. to 23° C.

5. The automated process of claim 4 wherein said process further comprises the step of thermally curing said plurality of pre-pregs while the pre-pregs are in or on the mould to form the moulded article, wherein thermal curing is conducted at a cure temperature of greater than 120° C., and wherein the surface layer remains part of the fibre-reinforced composite material during and after curing.

6. The automated process of claim 1 wherein the surface layer does not contain any reinforcing fibres.

7. The automated process of claim 6 wherein at least one of the pre-preg of the plurality of pre-preg is not associated with a protective removable interleave disposed on an external surface of the pre-preg and wherein the automated process does not comprise a step of removing said protective removable interleave.

8. The automated process of claim 1 wherein the first curable resin comprises one or more curable thermosetting resin(s) selected from the group consisting of epoxy resins, bismaleimides, vinyl ester resins, cyanate ester resins, isocyanate-modified epoxy resins, phenolic resins, benzoxazine, formaldehyde condensate resins, polyesters, acrylics, and combinations thereof.

9. The automated process of claim 1 wherein each of the first and second curable resins comprises at least one selected from multi-functional epoxy resin, wherein said multifunctional epoxy resin is selected from diglycidyl ether of bisphenol F (DGEBF), diglycidyl ether of bisphenol A (DGEBA), diglycidyl dihydroxy naphthalene, resin based on phenol and cresol epoxy novolacs, glycidyl ethers of phenol-aldehyde adducts, aromatic epoxy resins, aliphatic triglycidyl ethers, dialiphatic triglycidyl ethers, aliphatic polyglycidyl ethers, epoxidised olefins, triglycidyl aminophenols, aromatic glycidyl amines, heterocyclic glycidyl imidines and amides, glycidyl ethers, fluorinated epoxy resins, N,N,N',N'-tetraglycidyl diamino diphenylmethane (TGDDM) and N,N,N',N'-tetraglycidyl-m-xylenediamine.

10. The automated process of claim 9 wherein the first and second curable resins are independently selected from curable resins which comprise:

a first difunctional epoxy resin component selected from bisphenol A epoxy resins; and/or
(ii) a second difunctional epoxy resin component selected from bisphenol F epoxy resins;
optionally in combination with one or more of the epoxy resin(s) selected from:
(iii) an epoxy phenol novolac (EPN) resin;
(iv) an epoxy cresol novolac (ECN) resin;
(v) triglycidyl aminophenol; and
(vi) tetraglycidyl diamino diphenyl methane (TGDDM).

11. The automated process of claim 1 wherein the second curable resin exhibits a viscosity at 21° C. of at least 1,000,000 Pa·s, and/or an uncured Tg of from about 12 to 30° C. and wherein the first curable resin exhibits a viscosity at 21° C. of no more than 300,000 Pa·s, and/or an uncured Tg of no more than 6° C.

12. The automated process of claim 5, wherein curing is performed at a temperature in the range of from 130° C. to 150° C. for a period of no more than 10 minutes.

13. The automated process of claim 6 wherein a surface layer is disposed on both surfaces of said core layer and the surface layer exhibits an areal weight of from about 5 to about 100 g/m$^2$.

14. The automated process of claim 1 wherein the core layer exhibits an areal weight of from about 200 to about 1500 g/m$^2$.

15. The automated process of claim 5 wherein the surface layer of the prepreg is tack-free prior to curing.

16. The automated process of claim 1 wherein the pre-preg exhibits a permeability to air such that a 100×100 mm sample of the pre-preg is retained for at least 60 seconds by a silicone suction cup of external diameter 22 mm and working internal diameter 20 mm exerting a vacuum level defined by an open flow-rate of 20 liters/min prior to contact with the surface of the pre-preg.

17. The automated process of claim 16 wherein the pre-preg exhibits an air permeability:
such that the flow rate through the pre-preg is no more than 18 liters/min, measured when the pre-preg has been retained for 60 seconds by a silicone suction cup of external diameter 22 mm and working internal diameter 20 mm exerting a vacuum level defined by an open flow-rate of 20 liters/min prior to contact with the surface of the pre-preg; and/or
(ii) of no more than 4 cm$^3$/s/cm$^2$, as measured according to ASTM D737-04.

18. The automated process of claim 1 wherein said pre-preg is flexible at 20° C.

* * * * *